Nov. 25, 1969 HIROSHI AIBA 3,480,720

HOOK BUTTON CONTROL DEVICE OF AN AUTOMATIC TELEPHONE ANSWERING APPARATUS

Filed March 17, 1967

INVENTOR

HIROSHI AIBA

BY Sughrue, Rothwell, Mion, Zinn & Macpeak

ATTORNEYS.

United States Patent Office
3,480,720
Patented Nov. 25, 1969

3,480,720

HOOK BUTTON CONTROL DEVICE OF AN AUTOMATIC TELEPHONE ANSWERING APPARATUS

Hiroshi Aiba, 10–13 2-chome, Igusa Suginama-ku, Tokyo, Japan

Filed Mar. 17, 1967, Ser. No. 623,877
Claims priority, application Japan, Mar. 18, 1966, 41/16,426
Int. Cl. H04m *1/64*
U.S. Cl. 179—1 4 Claims

ABSTRACT OF THE DISCLOSURE

An apparatus for raising a telephone hook button having a solenoid, energized by the bell circuit, for raising the button without raising the handset when the solenoid is energized; and having a spring for raising the button when the handset is lifted from its cradle. The solenoid and spring act through a pivoted lever and a sliding lever.

This invention relates to a hook button control device of an automatic telephone answering apparatus used to answer incoming calls by releasing the hook button without lifting the handset of the telephone.

Heretofore, it has been known to provide a plunger in a telephone to lift the handset directly. However, this kind of an automatic telephone answering apparatus requires considerable power consumption for operation of the plunger against the weight of the handset. Moreover, the handset occasionally falls from its cradle as the plunger automatically lifts it.

One object of the present invention is to provide a novel and improved device for controlling a hook button of an automatic telephone answering apparatus which eliminates the above stated defects.

Another object of the present invention is to provide a novel and improved device for controlling a hook button of an automatic telephone answering apparatus which includes a shaft connected to said cradle and slidable in a base plate of the control device, and a changeover lever rotatably connected to said sliding shaft for releasing said hook button when rotated by a solenoid (electro-magnet) which is energized by the bell signal.

Hereinafter, the present invention will be described with reference to an embodiment shown in the accompanying drawings wherein like characters indicate like parts in the several views, and:

Figures 1, 2:
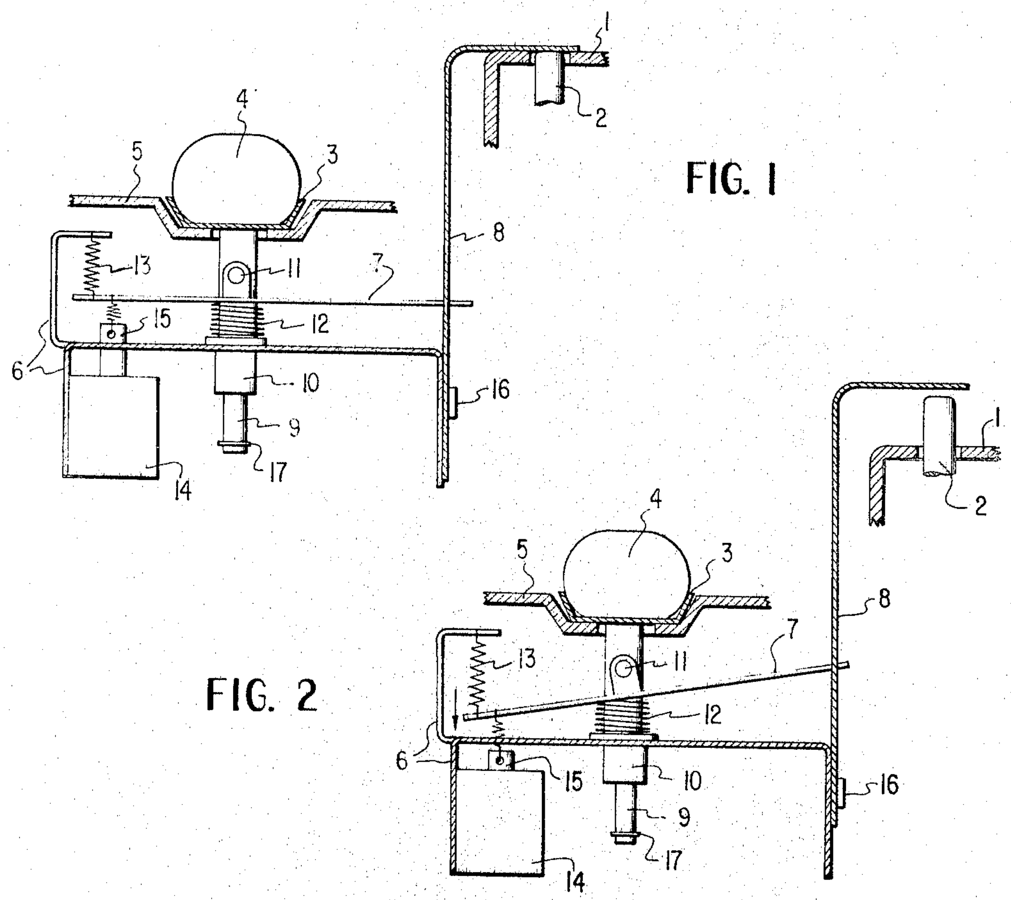
FIG. 1 shows a cross sectional view of an embodiment of a device in the state of standby for operating a hook button according to the present invention.
FIG. 2 shows a cross sectional view of said apparatus in the state of answering.

In the drawings, 1 is a telephone body, 2 is a hook button, 3 is a cradle for a handset 4, 5 is a base plate of the control device, 6 is a base plate for mounting the present device, 7 is a T-shaped change-over lever of the hook button. A control lever 8 of the hook button moves in association with said change-over lever 7. In other words, control lever 8 of hook button 2 is moved up and down by the motion of change-over lever 7 to cause hook button 2 to assume its ON and OFF positions respectively. A shaft 9 is fixed to the lower part of said cradle 3 and is slidably attached to mounting base plate 6 through a bushing 10. A change-over lever shaft 11 is provided at a suitable part of the sliding shaft 9. A spring 12 urges sliding shaft 9 in an upward direction, while a spring 13 urges change-over lever 7 toward its standby position. 14 denotes a solenoid which is energized by the bell circuit.

Referring to FIG. 2, as a bell signal denoting an incoming call arrives at the telephone equipped with the hook button control device, solenoid 14 is energized by said signal and plunger 15 is withdrawn into the solenoid. Change-over lever 7 is rotated about shaft 11 against the force of spring 13 as shown by the arrow. As change-over lever 7 rotates, it lifts control lever 8 vertically along a guide 16 provided on mounting base plate 6. Accordingly, hook button 2 is allowed to assume its ON position without lifting handset 4 from cradle 3.

Figure 3:
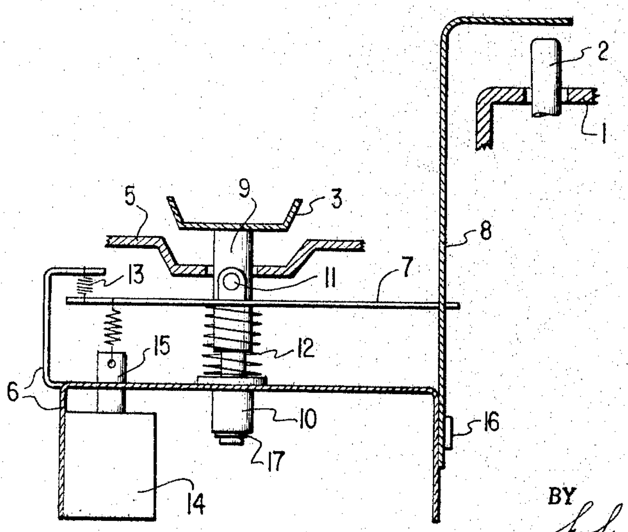
FIG. 3 shows a cross sectional view of said apparatus in the state that the handset is taken up manually for transmitting.

Referring to FIG. 3, when handset 4 is removed from its cradle 3, the cradle is lifted by spring 12 acting through change-over lever 7, change-over shaft 11, and sliding shaft 9. Stopper 17 limits the upward travel of shaft 9. As cradle 3 rises, change-over lever 7 lifts control lever 8, and hook button 2 is allowed to assume its ON position. Of course, if the handset is again mounted on cradle 3, change-over lever 7 is pushed down against the force of the spring 12 by the weight of the handset 4 itself. Then the control lever 8 is pushed down, so that hook button 2 is lowered and the telephone circuit is opened and restored to the standby state as shown in FIG. 1.

According to the present invention, messages may be received when the telephone is unattended since the handset need not be lifted. Moreover, the telephone is capable of being used in the conventional way. The construction and operation of the present device is simple, the function is stable, and mass production is easy.

This invention is not to be confined to any strict conformity with the drawings or description, but may be changed or modified so long as such changes or modification make no material departure from the salient features of the invention as expressed in the appended claims.

What is claimed is:

1. A hook button control device for an automatic telephone answering apparatus which raises the hook button of a telephone without lifting the handset comprising (a) a vertically slidable cradle assembly for receiving a handset of said telephone;

(b) a hook button control lever having a first and second position in which it depresses and raises said hook button, respectively; and (c) a hook button change-over lever rotatably mounted on said cradle assembly and having a first end movable by an electromagnet energized by an incoming call, and a second end operably connected to said control lever for moving said control lever from its first position to its second position when said electromagnet is energized.

2. A hook button control device as defined in claim 1 wherein said change-over lever rotates about a horizontal axis and said first and second ends of said change-over lever move in substantially downward and upward directions, respectively, upon energization of said electro-magnet.

3. A hook button control device as defined in claim 2 further comprising a spring connected to said first end of said change-over lever and biasing it in an upward direction.

4. A hook button control device as defined in claim 1 further comprising a spring mounted on said cradle assembly for resiliently urging said assembly in an upward direction to raise said assembly and said changeover lever when the handset is removed from said cradle.

References Cited

UNITED STATES PATENTS 2,658,107 11/1953 Zimmerman ---------- 179—6

3,135,831 6/1964 Youtie --------- 179—159 XR

KATHLEEN H. CLAFFY, Primary Examiner

J. S. BLACK, Assistant Examiner

U.S. Cl. X.R.

179—6